No. 12,141. REISSUED AUG. 4, 1903.

J. S. STONE.

APPARATUS FOR SELECTIVE ELECTRIC SIGNALING.

APPLICATION FILED JULY 11, 1903.

WITNESSES:

F. B. Spaulding

G. Adelaide Higgins

INVENTOR:

John Stone Stone

No. 12,141. Reissued August 4, 1903.

UNITED STATES PATENT OFFICE.

JOHN STONE STONE, OF CAMBRIDGE, MASSACHUSETTS, ASSIGNOR TO THE STONE TELEGRAPH AND TELEPHONE COMPANY, OF BOSTON, MASSACHUSETTS.

APPARATUS FOR SELECTIVE ELECTRIC SIGNALING.

SPECIFICATION forming part of Reissued Letters Patent No. 12,141, dated August 4, 1903.

Original No. 714,834, dated December 2, 1903. Application for reissue filed July 11, 1903. Serial No. 165,539.

*To all whom it may concern:*

Be it known that I, JOHN STONE STONE, a citizen of the United States, residing at Cambridge, in the county of Middlesex and State of Massachusetts, have invented certain new and useful Improvements in Apparatus for Selective Electric Signaling, of which the following is a specification.

My invention relates to the art of wireless or space telegraphy—*i. e.*, to the art of transmitting intelligence from one station to another by means of free or unguided electromagnetic signal-waves or waves which are developed by producing electric vibrations in an elevated conductor, preferably vertically elevated, and which are not guided to their destination by wires, as in the system of telegraphy most commonly practiced to-day.

The object of the present invention is to realize a system in which the transmitting-stations may selectively transmit their signals each to a particular receiving-station simultaneously or otherwise without mutual interference.

It is also the object of the invention to provide means whereby each of a plurality of transmitting and receiving stations in such a system may be enabled to selectively place itself in communication with any other station to the exclusion of all remaining stations.

It is further the object of the present invention to so construct and proportion the electroreceptive device with reference to the receiving-circuit in which it is included that it may render such circuit resonant to the desired frequency.

The fundamental or underlying principles of the present invention are fully described in an application for United States patent, Serial No. 4,505, filed by me February 8, 1900, and the present invention is, moreover, tributary to an application for United States patent, Serial No. 44,384, filed by me January 23, 1901. The present specification describes and claims a specific form of the broad inventions described and claimed in the aforesaid applications Serial Nos. 4,505 and 44,384.

By my invention the elevated conductor of the transmitting-station is made the source of signal-waves of but a single frequency, and the translating apparatus at the receiving-station is caused to be selectively responsive to signal-waves of but a single frequency, so that the transmitting apparatus corresponds to a tuning-fork sending but a single musical tone, and the receiving apparatus corresponds to an acoustic resonator capable of absorbing the energy of that single musical tone only. When the apparatus at a particular receiving-station is made resonant to the same frequency as that of the electromagnetic waves emanating from a particular transmitting-station, then this receiving-station will respond to and be capable of selectively receiving messages from that particular transmitting-station to the exclusion of messages simultaneously or otherwise sent from other transmitting-stations in the neighborhood which generate electromagnetic waves of other frequencies. Moreover, by my invention the operator at the transmitting or receiving station may at will adjust the apparatus at his command in such a way as to place himself in communication with any one of a number of stations in the neighborhood by bringing his apparatus into resonance with the frequency employed by the station with which intercommunication is desired.

Having thus broadly described the nature and object of the invention and having given at some length the electrical principles upon which it is based in the hereinbefore-mentioned applications, Serial Nos. 4,505 and 44,384, it will suffice to give a brief statement of the electrical operation of the apparatus to be hereinafter more fully specified. At this point reference may be conveniently made also to the specification of an application filed by me August 2, 1902, Serial No. 118,048, wherein are again set forth at length the principles underlying my system of space telegraphy, of which the present invention forms a part, and it is not deemed necessary to repeat the same here.

The details of the present invention may best be described by making reference to the drawings which accompany and form a part of this specification.

The same characters, so far as may be, represent similar parts in all the figures of my drawings.

In the drawings, V represents an elevated conductor or vertical oscillator.

M M′ $M_1$ $M'_1$ are induction-coils or transformers.

L L′ L″ and $L_1$ $L'_1$ $L''_1$ are auxiliary inductance-coils.

C C′ C″ and $C_1$ $C'_1$ $C''_1$ are condensers.

B is a battery in Figure 2, and 7 is a battery in Fig. 4.

K is a coherer.

R is a relay in Fig. 2, and 6 is a relay or sounder in Fig. 4.

P is a Planté battery or condenser of large capacity.

E is an earth connection.

Figure 1:
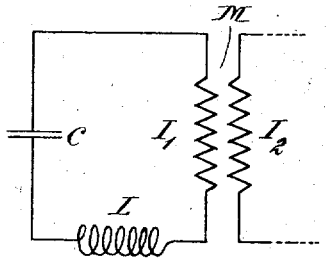
Fig. 1 is a reproduction of Fig. 12 of the drawings of case Serial No. 4,505 and case Serial No. 44,384, above mentioned. It is a diagram illustrating the connection of a condenser-telephone at a receiving-station.

With reference to Fig. 1 attention is called to the fact that in the specification and drawings of my application Serial No. 4,505, above mentioned, it was pointed out that although a coherer had been shown and described as a means of detecting the presence of oscillations in a receiving-circuit, under which circumstances it operated as a telegraphic relay to control the local-battery circuit, including a electrotranslating device, yet any other suitable electroreceptive device might be employed to receive a signal—as, for example, a condenser-telephone. It was further pointed out that when such a telephone was employed as a receiver its capacity might be the capacity by which the receiving-circuit of which it formed a part was attuned.

In Fig. 1 the circuit of which the primary coil $I_2$ forms a part is connected either conductively or inductively with the elevated conductor at the receiving-station, all as more fully described in the case of applications above referred to. In the circuit C L $I_1$, $I_1$ is the secondary of the coil M, of which $I_2$ is the primary. The coil L is an inductance-coil and adapted to supply the necessary auxiliary inductance tuning the circuit C L $I_1$, and C is a condenser which serves both as an electro receptive or translating device and also as a capacity by which the circuit C L $I_1$ is made resonant to the desired frequency.

Figure 3:
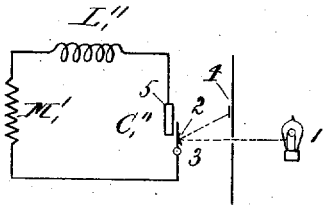
Figs. 3 and 4 are diagrams illustrating the tuning-condenser of a resonant circuit used as a receiver.

In Fig. 3 is shown one form of the translating device, wherein the light from the lamp 1, reflected by the mirror 2 on the moving armature 3 of the tuning-condenser $C''_1$, records the movement of said armature on scale 4 when a current flows in the circuit $M'_1$ $L''_1$.

Figure 4:
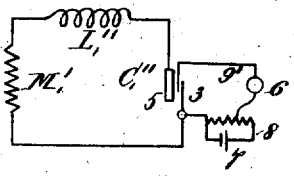

In Fig. 4 the movable armature 3 closes the circuit of relay or sounder 6 by making contact with the post 9′. This local circuit is supplied with any desirable amount of energy from the battery 7 by the connection of its terminals to the resistance 8.

Figure 5:
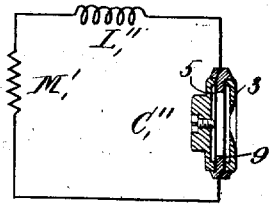
Fig. 5 shows a form of the well-known condenser-telephone receiver used as a tuning-condenser in a resonant receiving-circuit.

In Fig. 5 the condenser $C''_1$ is shown as forming part of the well-known condenser-telephone receiver 9. Here, as in Figs. 3 and 4, the armature 5 is fixed, and the armature 3 is movable.

In the operation of Fig. 1 electromagnetic waves impinging upon an elevated conductor (not shown in the drawings) develop electrical oscillations in the associated coil $I_2$ of the induction-coil M. The energy of these oscillations is communicated to the circuit C L $I_1$, which is made resonant through the capacity of the condenser C and inductance of the coil L to the frequency of the waves the energy of which the receiver C is intended to receive.

Figure 2:
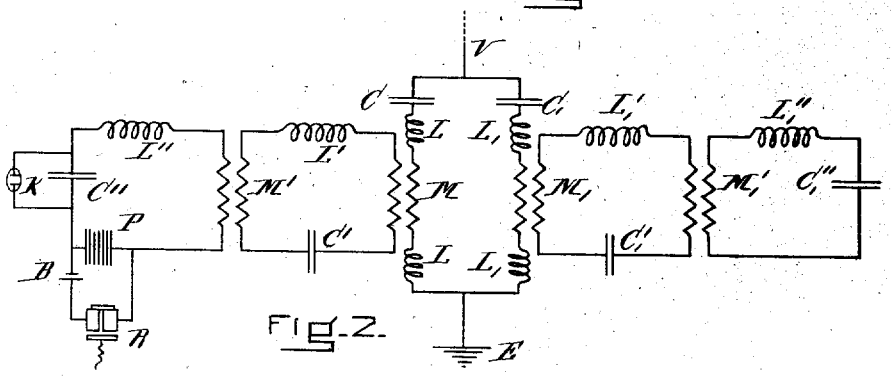
Fig. 2 is a diagram illustrating the application of a condenser-receiver to a system whereby several receiving-stations associated with a single elevated conductor may selectively receive the energy of electromagnetic signal-waves of different frequencies, each in a particular electro receptive or translating device, to the exclusion of the energy of electromagnetic waves of different frequencies.

In the operation of the receiving-station shown in Fig. 2 electromagnetic waves of a given frequency impinging upon the elevated conductor V develop therein corresponding electric vibrations of like frequency. If the frequency of these vibrations be that to which the branch circuit C L M is made resonant, the energy of the vibrations will be received in that branch to the exclusion of the branch $C_1$ $L_1$ $M_1$, which is made resonant to a different frequency. The energy so received in branch C L M is communicated, by means of the induction-coil M, to the circuit C′ M′ L′ M, which is made resonant to the same frequency as the branch circuit C L M, and thence the energy is communicated to the circuit C″ L″ M″, which is likewise made resonant to the same frequency as that of the branches C′ M′ L′ M and C L M. The energy so received in circuit C″ L″ M″ operates an electro receptive or translating device, (indicated at K.) If the electromagnetic waves impinging upon the elevated conductor V be of the frequency to which the branch circuit $C_1$ $L_1$ $M_1$ is made resonant, the energy of the resulting vibration in the elevated conductor V will be received in that branch to the exclusion of the branch C L M, which is made resonant to a different frequency. The energy so received by the branch $C_1$ $L_1$ $M_1$ will be communicated to the circuit $C'_1$ $M'_1$ $L'_1$ $M_1$, which is made resonant to the same frequency as the branch $C_1$ $L_1$ $M_1$, and thence to the circuit $C''_1$ $L''_1$ $M'_1$, which is made resonant to the same frequency as the circuits $C'_1$ $M'_1$ $L_1$ $M_1$ and $C_1$ $L_1$ $M_1$. Energy so received causes the operation of an electro receptive or translating device indicated at $C''_1$. In the circuit $C''_1$ $L''_1$ $M'_1$ the element $C''_1$ serves both as an electro receptive or translating device and as a tuning-condenser, by which the circuit $C''_1$ $L''_1$ $M'_1$ is made resonant to the desired frequency. It is actuated by the current developed in its circuit, utilizing therefor the potential energy of the current. This element will be hereinafter more fully described. When electric vibrations are set up in the circuit M′ L″ C″ of Fig. 2, the coherer K is cohered. The battery B is thereby permitted to develop a current in the circuit B R M′ L″ K. The function of the Planté battery or condenser P is simply to provide a low impedance or short circuit for the electric vibrations, while preventing the battery B from normally developing a current through the relay R. This relay by its operation may cause a telegraphic sounder or other telegraphic receiver to respond, and they may also set in motion a tapper or decoherer, by which the coherer is restored to its normal condition of high resistance.

The electro receptive or translating device shown at $C''_1$, Fig. 2, is primarily a tuning-condenser for the circuit $C''_1$ $L''_1$ $M'_1$; but it also serves to make evident the presence of electric vibrations in said circuit. It consists of a fixed armature or electrode and a movable armature or electrode. If electrical vibrations be of the frequency to which the circuit is made resonant, the electrodes of $C''_1$ will be at a difference of potential many times greater than the induced or impressed electromotive force. This difference of potential will cause an attraction between the armatures of $C''_1$ and will cause the movable armature to approach the fixed armature. This motion may be utilized to close a local circuit, and thereby operate a telegraphic relay or sounder, or it may be caused to deflect a beam of light reflected from its surface. The normal capacity of $C''_1$ is determined by the condition that it shall serve to tune the circuit with which it is associated, but leaves the dimensions of its armatures and their separation undetermined. In order to get the maximum sensitiveness in the instrument, the separation between the opposing surfaces of the armatures is made as small as practicable, and consequently, therefore, the area of the armature-surfaces is also a minimum. By these means the entire potential energy of the vibratory current in the circuit $C''_1$ $L''_1$ $M'_1$ is made available to operate the electric translating device, and since the armatures are very close to each other the rate of change of the energy produced by the motion of the movable armature is at a maximum. The available force to produce this motion is thus made as great as possible.

In constructing the various parts of the apparatus shown and described in this specification there is great latitude as to the special forms that may be given them; but it must be remembered that when a circuit is to be made resonant and it is desired to gain a high degree of resonance both electrostatic and electromagnetic hysteresis must be carefully excluded from the resonant circuit. For this reason all iron should be excluded from the coils in the resonant circuits and solid dielectrics should not ordinarily be employed in the condensers. These injunctions apply to the construction of circuits made resonant to very high frequencies, but not with the same force to the construction of circuits to be resonant to low frequencies. Another precaution to be taken in the construction of the apparatus included in the resonant circuits when very high frequency currents are employed is that conductors between which there exists considerable potential difference during the operation of the apparatus shall be kept as far apart as practicable, because of the excessive displacement currents which tend to flow in the case of high frequencies. For this reason I so design the coils used in the resonant circuit that their potential energy is small compared to their kinetic energy when supporting a current of the frequency to which the resonant circuit in which they are included is made resonant. In this way the frequency of the gravest of the natural modes of vibration of the coil itself is made very great compared to the frequency to which the circuit in which the coil is included is made resonant.

Having described my invention, I claim—

In a system of space telegraphy, a resonant circuit including a condenser having one fixed armature and one movable armature, in combination with means for indicating the movement of said movable armature.

JOHN STONE STONE.

Witnesses:
CHARLES C. KURTZ,
ALEX. P. BROWNE.